US006622066B2

(12) United States Patent
Ishihara et al.

(10) Patent No.: US 6,622,066 B2
(45) Date of Patent: Sep. 16, 2003

(54) EGPWS CUTOFF ALTITUDE FOR HELICOPTERS

(76) Inventors: Yasuo Ishihara, 12909 NE. 136th Pl., Kirkland, WA (US) 98034; Steven C. Johnson, 4237 245th Ave. SE., Issaquah, WA (US) 98029; Kevin J Conner, 726 Alford Ave. N., Kent, WA (US) 98031-3122

( * ) Notice: Subject to any disclaimer, the term of this patent is extended or adjusted under 35 U.S.C. 154(b) by 0 days.

(21) Appl. No.: 10/056,711

(22) Filed: Jan. 23, 2002

(65) Prior Publication Data

US 2002/0099478 A1 Jul. 25, 2002

Related U.S. Application Data

(60) Provisional application No. 60/263,842, filed on Jan. 23, 2001.

(51) Int. Cl.[7] .......................... G06F 7/00; G06F 19/00

(52) U.S. Cl. .................... 701/9; 701/7; 701/8; 701/14; 701/207; 701/301; 340/970; 340/945; 340/961; 340/969; 340/963; 342/29

(58) Field of Search ............................. 701/3, 4, 7–9, 701/14, 207, 213, 301; 340/970, 945, 961, 946, 963, 969; 342/29, 125, 30, 357.06

(56) References Cited

U.S. PATENT DOCUMENTS

| | | | | | |
|---|---|---|---|---|---|
| 3,946,358 | A | * | 3/1976 | Bateman | 340/970 |
| 3,988,713 | A | * | 10/1976 | Bateman | 340/970 |
| 5,351,032 | A | * | 9/1994 | Latorre et al. | 340/310.01 |
| 5,448,233 | A | * | 9/1995 | Saban et al. | 340/963 |
| 5,719,581 | A | * | 2/1998 | Poe | 342/120 |
| 5,839,080 | A | * | 11/1998 | Muller et al. | 701/9 |
| 5,884,223 | A | * | 3/1999 | Tognazzini | 701/301 |
| 5,892,462 | A | * | 4/1999 | Tran | 340/961 |
| 6,021,374 | A | * | 2/2000 | Wood | 701/301 |
| 6,076,042 | A | * | 6/2000 | Tognazzini | 701/301 |
| 6,088,634 | A | | 7/2000 | Muller et al. | 701/9 |
| 6,092,009 | A | | 7/2000 | Glover | 701/14 |

* cited by examiner

*Primary Examiner*—Thomas G. Black
*Assistant Examiner*—Ronnie Mancho
(74) *Attorney, Agent, or Firm*—Honeywell Int'l Inc.

(57) ABSTRACT

An apparatus, method and computer program product for suppressing an alert generated by a terrain awareness system rotary wing aircraft of potentially hazardous proximity to terrain also reduces nuisance warnings and provides a terrain display consistent with the unique performance capabilities of such aircraft.

33 Claims, 9 Drawing Sheets

100 DETERMINE CUT-OFF ALTITUDE

110 DRAW FROM DATA BUS, INSTANTANEOUS AIRCRAFT POSITION, POSITIONAL UNCERTAINTY, GEOMETRIC ALTITUDE, GROUND SPEED, AND TRACK

200 DRAW FROM DATABASE TERRAIN, NEAREST RUNWAY INFORMATION, AND MINIMUM DISPLAYED TERRAIN ELEVATION

300 DETERMINE NEAREST RUNWAY CUT-OFF ALTITUDE AND CUT-OFF HEIGHT (FIG. 5.)

400 DETERMINE CUT-OFF ALTITUDE RELATIVE TO AIRCRAFT (FIG. 6.)

500 DETERMINE GROUND SPEED CUT-OFF ALTITUDE (FIG.7.)

600 DETERMINE ABSOLUTE CUT-OFF ALTITUDE FOR DETECT (FIG.8.)

800 DETERMINE CUT-OFF ALTITUDE FOR DISPLAY (FIG. 9.)

900 SEND DETERMINED PARAMETERS TO THREAT ASSESSMENT FUNCTION IN EGPWS

EGPWS CUTOFF ALTITUDE FOR HELICOPTERS

PRIORITY CLAIM

This application claims priority from U.S. Provisional application Ser. No. 60/263,842 titled "EGPWS Cutoff Altitude for Helicopters," filed Jan. 23, 2001.

FIELD OF THE INVENTION

This invention relates to a ground proximity warning systems and more particularly to ground proximity warning systems for helicopters.

BACKGROUND OF THE INVENTION

Ground proximity warning systems, or GPWS, provide aural and visual warnings of terrain features that indicate when the aircraft is or will be in potentially hazardous proximity to terrain, or when a flight condition exists that is apparently inconsistent with the aircraft's position relative to terrain. The early generation ground proximity warning systems use a radar altimeter to sense dangerous proximity to terrain. The radar altimeter senses both the proximity of the terrain and the rate by which that proximity or height above ground changes. The rate of proximity change is significant when compared to a predefined envelope to determine if a dangerous condition exists. Classic GPWS systems also contain additional alert functions called 'modes' that alert to other potentially hazardous conditions based on flight regime.

GPWS devices have significantly enhanced the safety of commercial, military, and general aviation, but suffer from some limitations. Because GPWS systems lack a terrain information database, GPWS has only a limited ability to anticipate terrain hazards ahead of the aircraft. Thus, later generation GPWS devices, called EGPWS devices or terrain awareness and warning systems (TAWS), include a stored terrain database. An EGPWS compares the position of the aircraft in three-dimensional space with the stored terrain information to identify potential conflicts. Diminishing the reliance upon radar altimetry as the sole determinant of hazardous proximity has enhanced the EGPWS ability by giving the alerting envelope a significant look-ahead functionality. With the ability to anticipate the significant terrain hazards ahead, the EGPWS plots the anticipated path of the aircraft and alerts the pilot when a terrain avoidance maneuver is necessary. EGPWS devices may also include all the functionality and modes of the classic GPWS devices.

Nuisance warnings detract from the utility of the EGPWS. Nuisance warnings are warnings generated by the EGPWS that do not reflect an actual hazard. Such warnings may occur for a variety of reasons such as unique terrain features that trigger the alert without actually endangering the aircraft. When nuisance alerts become frequent, flight safety is compromised, because the pilot will either turn off the EGPWS or learn to ignore it. Refined EGPWS systems minimize nuisance alerts through the use of an absolute cutoff altitude, which is dynamically determined from surrounding terrain characteristics and aircraft flight parameters. Below the absolute cutoff altitude, all terrain proximity alerts are suppressed.

In the context of rotary winged aircraft, such as helicopters, many fixed-wing EGPWS assumptions may not hold true. The fixed-wing EGPWS assumes the aircraft can climb at a maximum finite angle, such as six-degrees to avoid terrain. However, many rotary wing aircraft can climb vertically or hover. In a helicopter, a fixed-wing EGPWS will alert unnecessarily during hovering flight near terrain. Similarly, merely setting the assumed maximum flight angle in a fixed-wing EGPWS to vertical would render the device non-functional, because no terrain alerts, including valid ones, would issue.

One fixed-wing EGPWS, manufactured by Honeywell International Inc., stores runway location and elevation information in its terrain database. The fixed-wing EGPWS uses the installed terrain database to generate an alert when the aircraft approaches terrain where there is no runway available. The fixed-wing EGPWS assumption that landing and take-off require proximity to an airport runway is valid for fixed wing aircraft. However, it is common practice for helicopter operators to fly into and out of non-airport environments. In such normal flight situations, a fixed-wing EGPWS would issue a nuisance alert.

Similarly, fixed-wing EGPWS systems suppress the display of all terrain features that lie below the absolute cutoff altitude in order to reduce display clutter. The use of the same absolute cutoff altitude for both alert and display stems from the assumption that fixed-wing aircraft intentionally operate near terrain only in the vicinity of airport runways. This assumption does not hold for rotary wing aircraft that routinely operate near terrain away from airports. In those situations, a fixed-wing EGPWS may not adequately display terrain features when such display would be a useful avoidance tool for the pilot.

The foregoing discussion highlights the need for modifications in the EGPWS warning and display algorithms to enhance its flight safety benefits to rotary-winged aircraft.

SUMMARY OF THE INVENTION

The present invention is an improved EGPWS system, method, and computer program product that reduces terrain proximity nuisance alerts in a highly maneuverable aircraft, such as a helicopter. The system or apparatus comprises a novel use of an aircraft speed signal to determine an absolute cutoff altitude, where terrain lying below the absolute cutoff altitude will not generate a ground proximity alert. The apparatus further comprises a database of stored terrain information, a signal-processing device, and an output. Where, for example, a present art EGPWS system might generate a warning on a slow approach of the aircraft to an off-runway landing site, the present invention will suppress that warning. Thus, the present invention enhances flight safety by presenting a more reliable indicator of the actual terrain hazard in such aircraft.

According to another aspect of the present invention, the invention exists as a system, method, and computer program product for the enhanced display of terrain proximate a low-flying rotary wing aircraft. Where, for example, a present art EGPWS system suppresses the display of terrain lying below the absolute cutoff altitude, the present invention allows for an expanded display of terrain relative to the lowest terrain elevation in the selected display area. The present invention accomplishes this by defining different absolute cutoff altitudes for alert detection and for display.

Further details and operation of the present invention will be described below with reference to the drawings. In the lexicon of the present invention, terrain encompasses both natural terrain features and man-made obstacles located on the ground.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENTS

Figure 1:
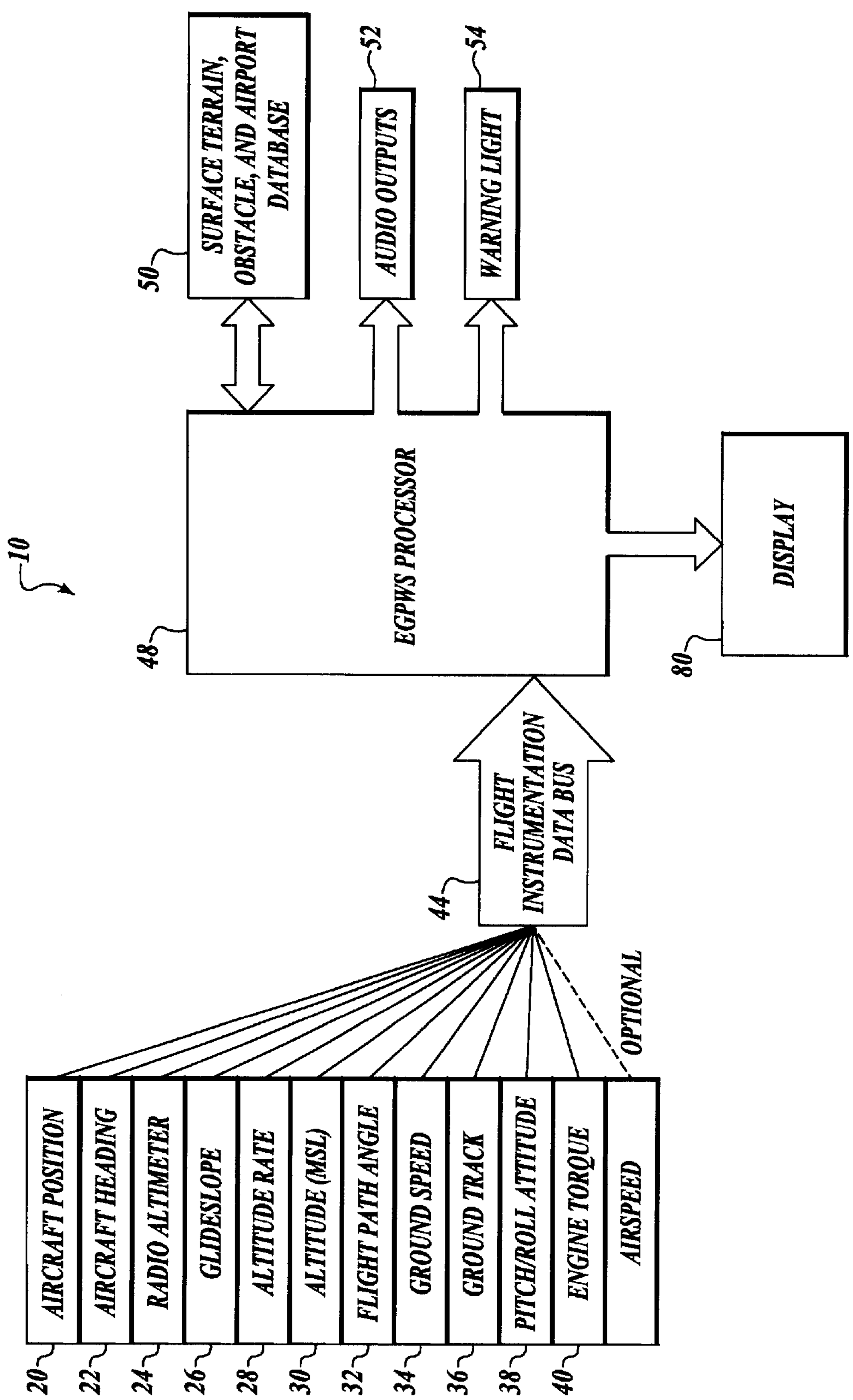
FIG. 1 is a block diagram of an EGPWS for use on helicopters according to an embodiment of the present invention.

As shown in FIG. 1, the Enhanced Ground Proximity Warning System (EGPWS) 10 of the present invention includes a EGPWS processor 48, a surface terrain, obstacle, and airport database 50, a display 80, audio outputs 52, and warning lights 54. EGPWS are in communicative connection with the flight instruments 20–42 in an aircraft via a flight instrumentation data bus 44. Exemplary flight instruments 20–42 that can determine the aircraft's flight condition and position include a global positioning system (GPS), a flight management system (FMS), or an inertial navigation system. The processor 48 might also garner aircraft location, position and attitude information from other aviation navigation systems such as, for example: DME/DME, VOR/DME, RNAV, and LORAN systems. The processor 48 may also receive some subset of the following aircraft information through an air data computer: aircraft position 20; aircraft heading 22; a radio altimeter reading 24; glideslope 26; altitude rate 28; altitude (MSL) 30; flight path angle 32; ground speed 34; ground track 36; pitch/roll attitude 38; and engine torque 40. In one embodiment, the present invention uses a blended GPS and barometric altitude, called geometric altitude, as an altitude indication. A description of geometric altitude is disclosed in related U.S. Pat. No. 6,216,064 entitled, "Method and Apparatus for Determining Altitude". However, the invention is not limited to these inputs and may also receive such information as airspeed. With this information, the processor 48 locates the aircraft in three-dimensioned space.

Figure 2:
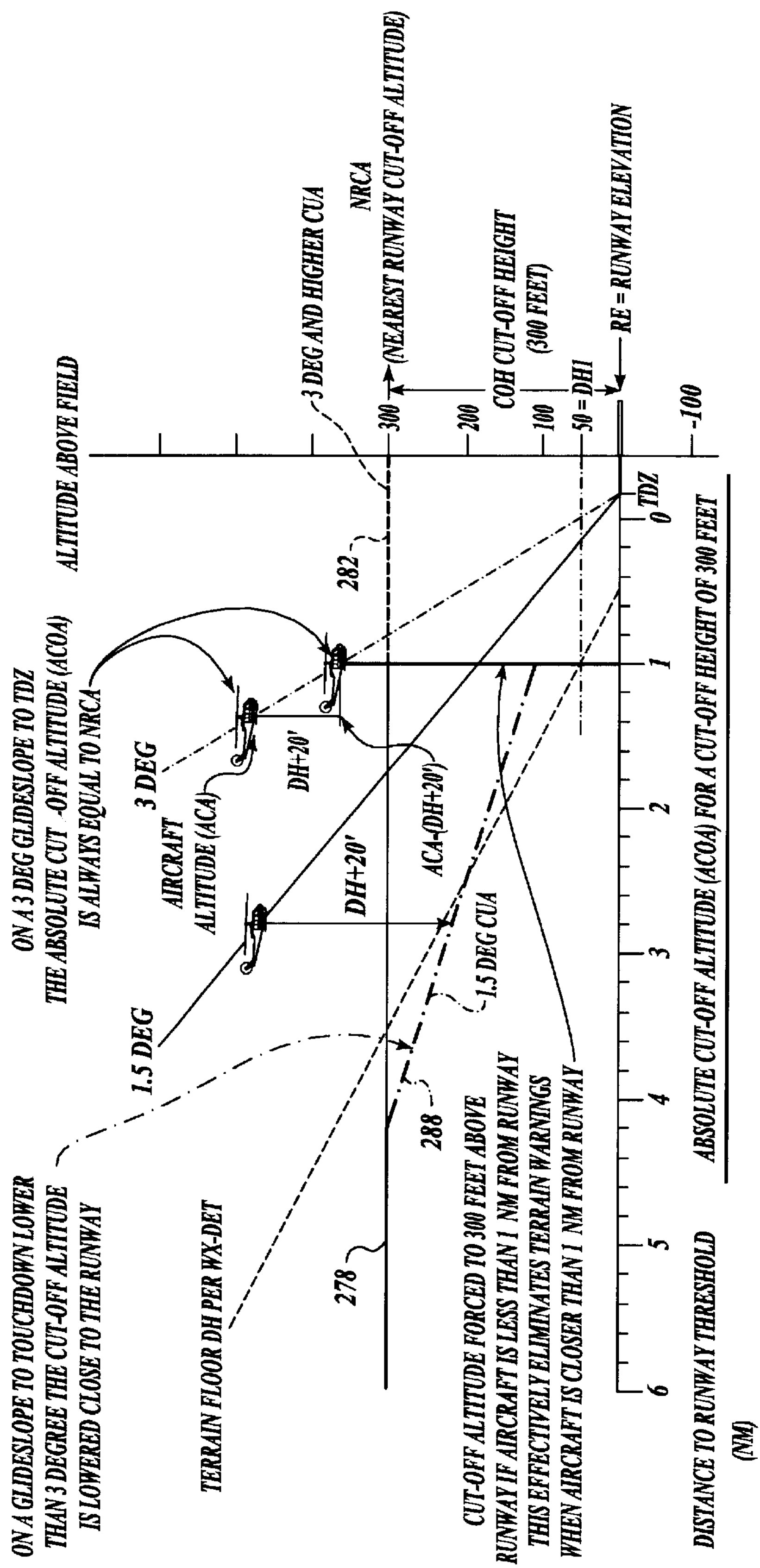
FIG. 2 is a graphic representation of the several variables relevant in the generation and suppression of nuisance alarms shared by the prior art and present invention EGPWS.

FIG. 2 illustrates the absolute cutoff altitude used by a prior art fixed-wing EGPWS. Any terrain alert caused by terrain lying below the absolute cutoff altitude is suppressed in order to reduce nuisance alarms. Also, the display of terrain features lying below the absolute cutoff altitude is suppressed in order to reduce display clutter.

A prior art EGPWS algorithm defines the absolute cutoff altitude as the lower of either a Nearest Runway Cutoff Altitude (NRCA) or a Cutoff Altitude Relative to the Aircraft (CARA). NRCA is a configurable fixed elevation above the runway nearest to the aircraft location, for example 300 feet above the runway elevation as shown by line segment 278 in FIG. 2. CARA is a corrected aircraft elevation adjusted downward by the factors Terrain Floor Delta Height (TFDH), delta height bias, and fixed bias. TFDH varies with, for example, distance to the nearest runway. Delta Height bias varies with, for example, estimated altitude error. Both terms may also vary with aircraft speed, as described in a related patent application entitled, "Delta Height Bias And Terrain Floor Generators For A Ground Proximity Warning System" with Ser. No. 09/917,374, filed on Jul. 27, 2001. Determination of the NRCA, the CARA, the terrain-floor delta-height and delta height bias is therefore already defined in the art, and is not an object of the present invention.

CARA, illustrated in FIG. 2 by line segment 288, is always located below the aircraft. When the aircraft is near the runway, the absolute cutoff altitude is forced to NRCA, as illustrated by line segment 282, in order to reduce both nuisance alerts display clutter on final approach. Thus, in the case of a fixed-wing aircraft approaching the runway on a 1.5 degree glideslope angle surrounded by level terrain, segments 278, 288 and 282 define the absolute cutoff altitude for suppressing both alert detection and display.

Absolute Cutoff Altitude for Threat Detection

Figure 3:
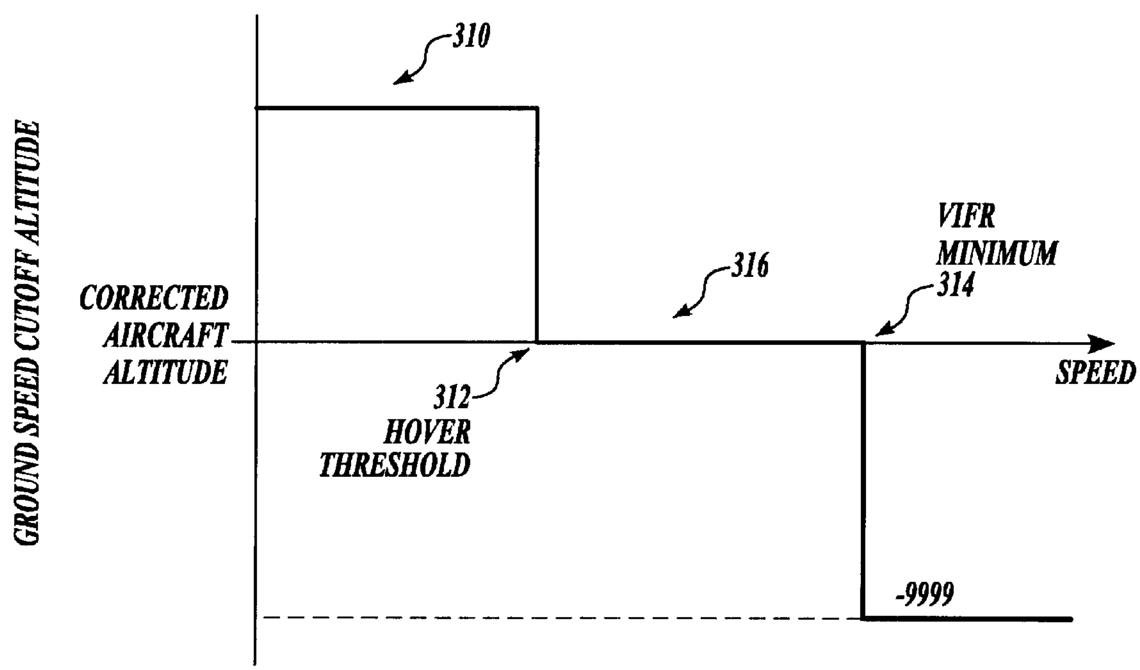
FIG. 3 is a graphic representation of the Ground Speed Cutoff Altitude (GSCA) algorithm of the present invention.

The EGPWS of the present invention modifies the absolute cutoff altitude for detection selection criteria with a novel Ground Speed Cutoff Altitude (GSCA) factor that varies exclusively with aircraft speed. A preferred embodiment of the GSCA is shown in FIG. 3. At and below a hover speed threshold 312, GSCA is set to an elevation that lies above the aircraft altitude, as illustrated by line segment 310. Between a hover speed threshold 312 and an approach speed threshold, or VIFR minimum speed 314, the GSCA is set to the corrected aircraft altitude 316, also known as skid height. Above the VIFR minimum speed 314, GSCA is forced to a large negative elevation −9999.

Absolute cutoff altitude for threat detection in the EGPWS of the present invention is defined by first selecting the lower of the NRCA and CARA, similar to that performed in the prior art EGPWS. The higher of the first selection and the GSCA is then selected as the absolute cutoff altitude for alert suppression.

The result of the selection method in the present invention is that, in hovering flight, all alerts, even those generated for proximate terrain lying a preconfigured distance above the aircraft, are suppressed. At speeds where a rotary wing aircraft may be slowly approaching a landing site at low altitude, or may be gathering speed at low altitude just after takeoff, all alerts for terrain below skid height are suppressed. At normal transit speeds, GSCA is forced to a large negative value, and is therefore never selected, so that the absolute cutoff altitude for detect is identical to the absolute cutoff altitude of the prior art.

Figure 4:
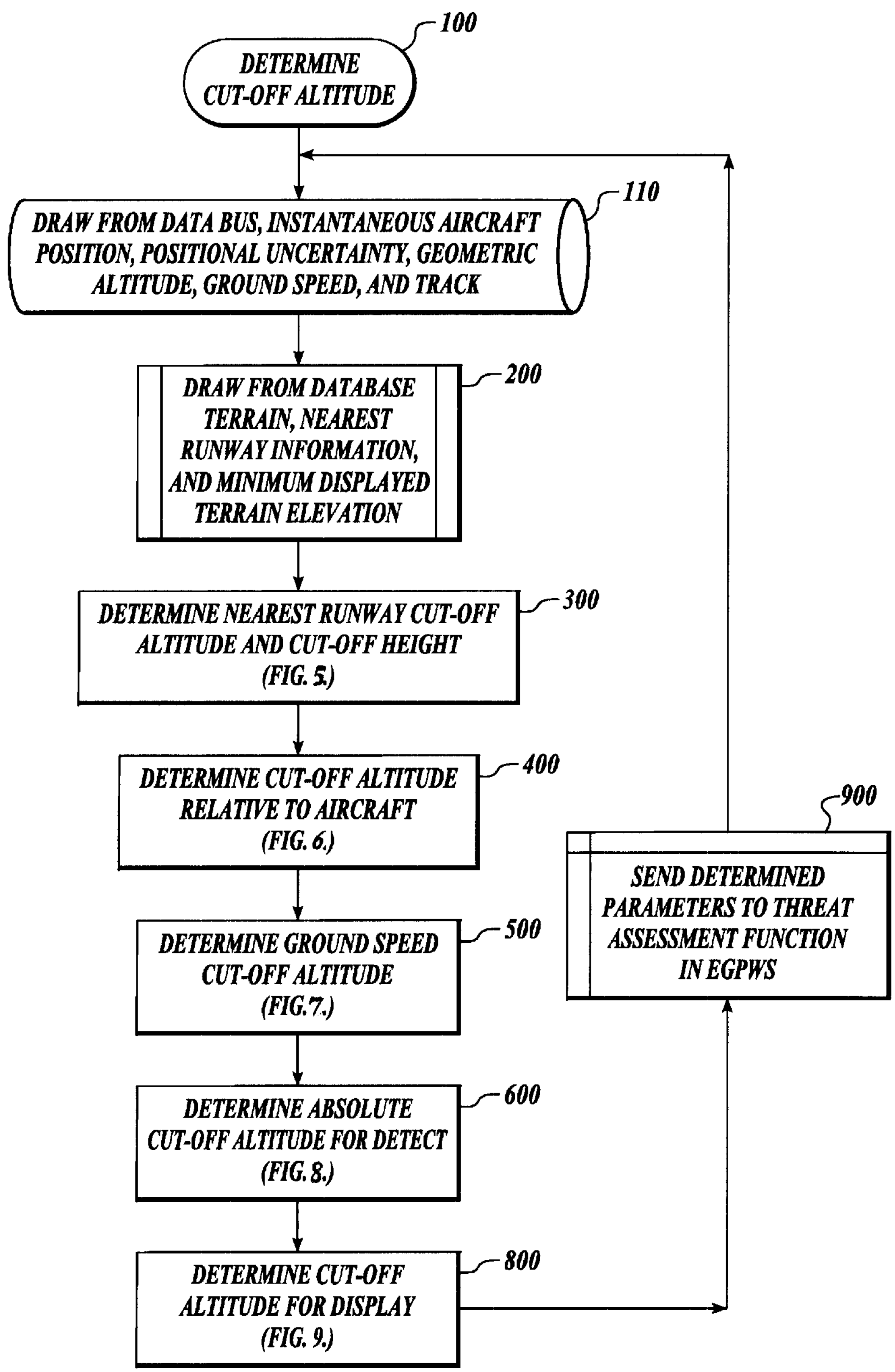
FIGS. 4–9 are logical flow diagrams of a process performed by the system shown in FIG. 1.

FIG. 4 portrays a summary of several flow charts (FIGS. 5–9) setting forth one embodiment of the inventive algorithm. The EGPWS in regular operation begins the determination of the absolute cutoff altitudes at 100. At step 110, the EGPWS obtains aircraft position data comprising, aircraft position, positional uncertainty, geometric altitude, ground speed, and projected track. Optionally, other flight parameters can be substituted, such as airspeed, barometric altitude or radio altitude.

At step 200, the processor 48 receives terrain data from the database 50 that corresponds to the present aircraft position at 200. Terrain data includes the minimum terrain elevation in the area selected for display by the pilot. The database 50 also provides to the processor 48 location of the nearest or selected runway. Where several runways are close to the aircraft position, the processor 48 compares the locations and determines the closer runway, its elevation, and the distance thereto. This runway selection process is already a known part of the regular and known procedure of the EGPWS, and is disclosed in U.S. Pat. No. 6,304,800, entitled "Methods, Apparatus and Computer Program Products for Automated Runway Selection", incorporated herein by reference. At 300, the processor 48 defines a nearest runway cutoff altitude based on the elevation of the nearest/selected runway and a positional uncertainty value. An exemplary method for determining these values is set out in FIG. 5.

Figure 5:
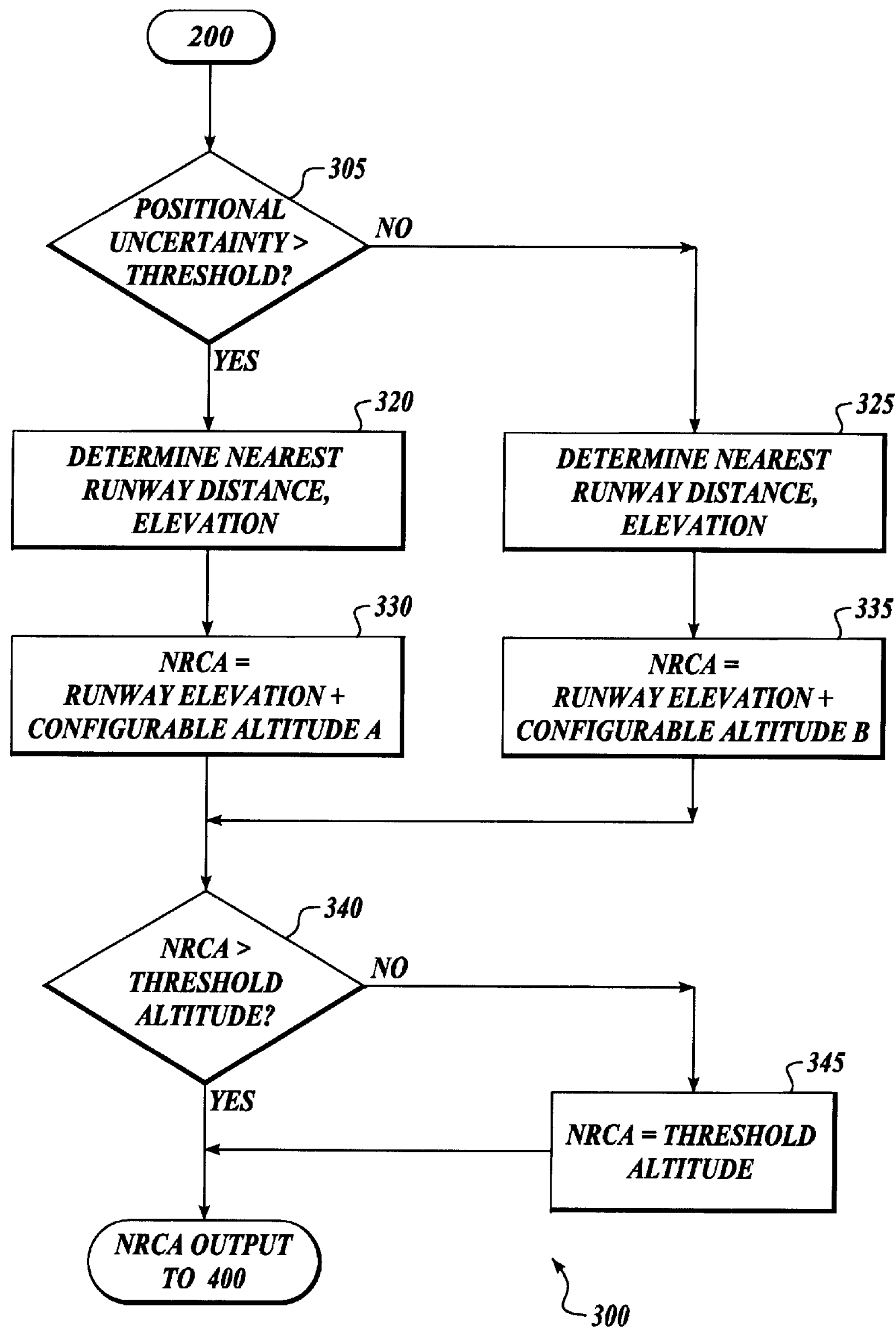
Figure 6:
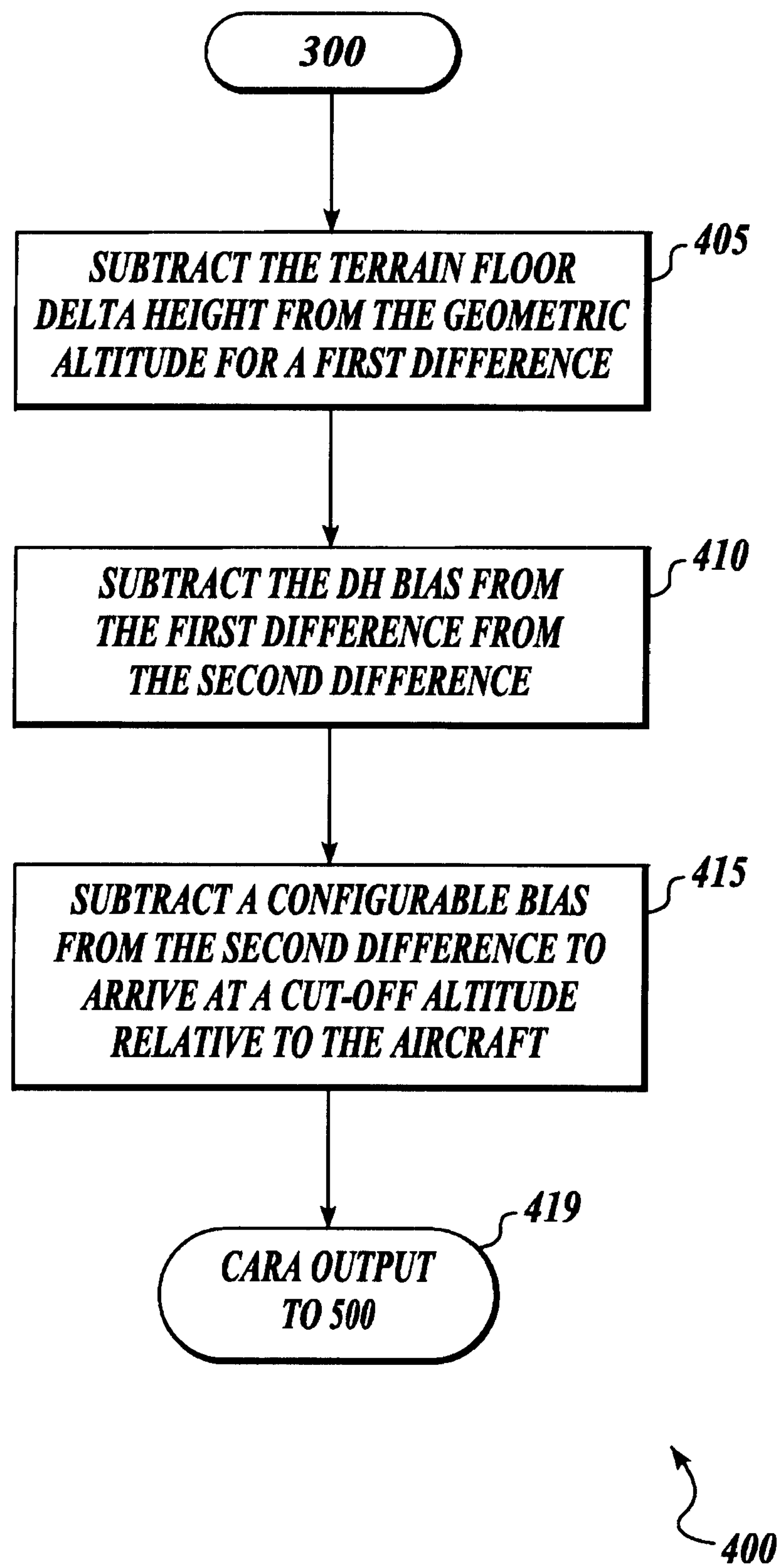

Referring to FIG. 5, the present invention first compares the positional uncertainty obtained at 110 with a preset value at 305. If the positional uncertainty is greater than the preset value, NRCA is calculated at 325 and 335 as the nearest runway elevation plus a configurable altitude B. A preferred embodiment of configurable altitude B is 500 feet. Conversely, if the positional uncertainty is less than the preset value, NRCA is calculated at 320 and 330 as the nearest runway elevation plus a configurable altitude A. A preferred embodiment of configurable altitude A is 400 feet.

Finally, the processor 48 tests the NRCA at 340 to determine whether it is lower than a threshold minimum flight altitude. If so, the processor 48 sets NRCA at 345 to the threshold altitude. Otherwise, NRCA remains at the value calculated in steps 305–335. Next, detailed at 400 in FIG. 6, the processor 48 determines a cut-off altitude relative to the aircraft (CARA). The EGPWS determines a cut-off altitude relative to the aircraft in any known manner, such as that described in co-pending application Ser. No. 09/865,333, entitled "APPARATUS, METHOD AND COMPUTER PROGRAM PRODUCT FOR HELICOPTER ENHANCED GROUND PROXIMITY WARNING SYSTEM". In a preferred embodiment, the processor 48 calculates a CARA from geometric altitude of the aircraft minus a terrain floor delta height (TFDH) at 405 and a delta height bias at 410 and a configurable fixed bias at 415, and outputs it at 419.

Figure 7:
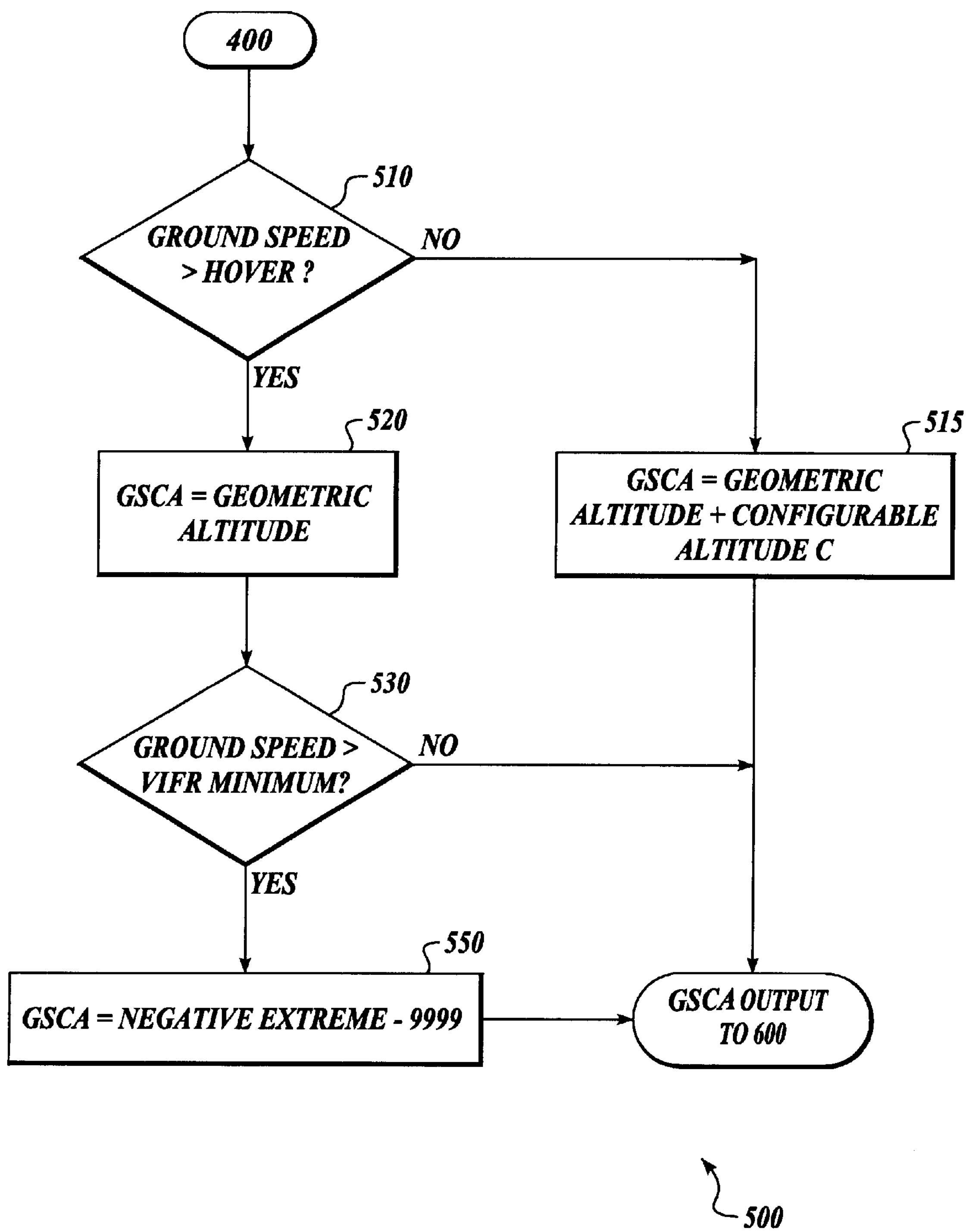

At 500, detailed in FIG. 7, the processor 48 determines a GSCA based on aircraft ground speed. FIG. 7 below demonstrates one algorithm for determining the GSCA. First, the processor 48 sets GSCA at 510, 515, and 520 at either the aircraft's skid height for speeds above the hover threshold, or at a configurable altitude C above skid height for speeds below the hover threshold. One configurable altitude C is 400 feet. The processor 48 further forces GSCA at 530 and 550 to a negative extreme if the ground speed is greater than an VIFR minimum speed 314. Thus, the GSCA output is one of three values, depending on aircraft ground speed.

The threshold speeds and altitudes used in the GSCA algorithm are consistent with typical flight operations in rotary wing aircraft. Where the ground speed is less than some configurable hover threshold 312, e.g. less than 50 knots, the ground speed cut-off level might appropriately lie above the aircraft. Except for extreme terrain hazards extending above this higher cut-off altitude, the slow speed of the aircraft is consistent with an anticipated landing in close proximity to the current aircraft position.

Where the speed is somewhat greater, but less than a minimum safe approach or minimum safe takeoff speed, also known as the VIFR minimum speed 314, e.g. between 50 and 60 kts, the EGPWS might best serve the pilot with a cut-off altitude set to the height of the landing gear. This recognizes that the flight profile is consistent with a slowing approach to landing, or alternatively a buildup of speed at low altitude just after takeoff. Here, the EGPWS suppresses terrain alerts below the aircraft, in a stage of flight where the pilot still has the opportunity to see hazards at the pilot's level that might endanger that approach.

The EGPWS sets the cut-off level to a negative extreme of the system for speeds above the VIFR minimum speed 314. This effectively removes GSCA from further consideration as the absolute cutoff altitude. Thus, at normal transit speeds, the invention suppresses alerts in the manner of the prior art EGPWS.

Figure 8:
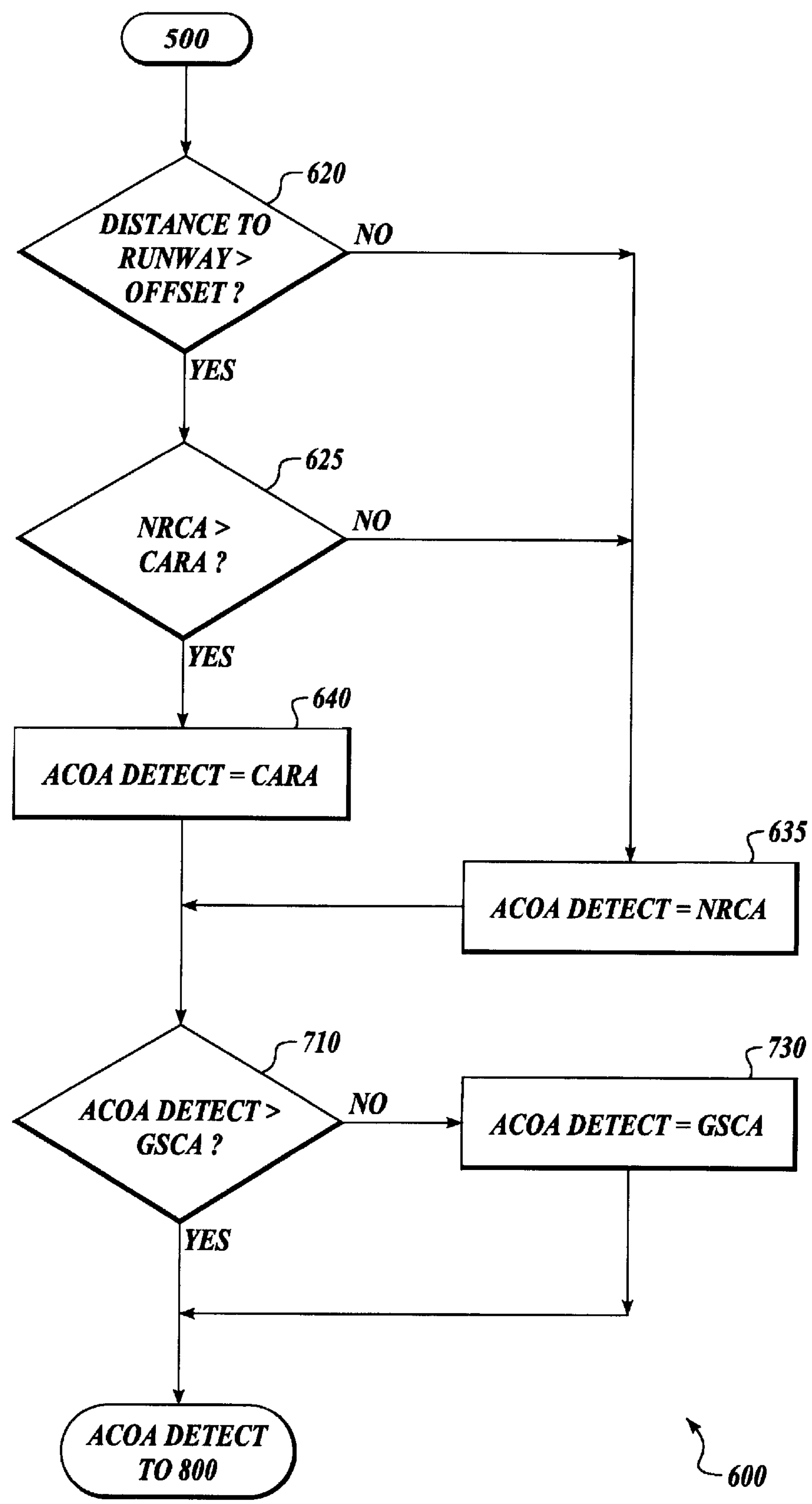
Figure 9:
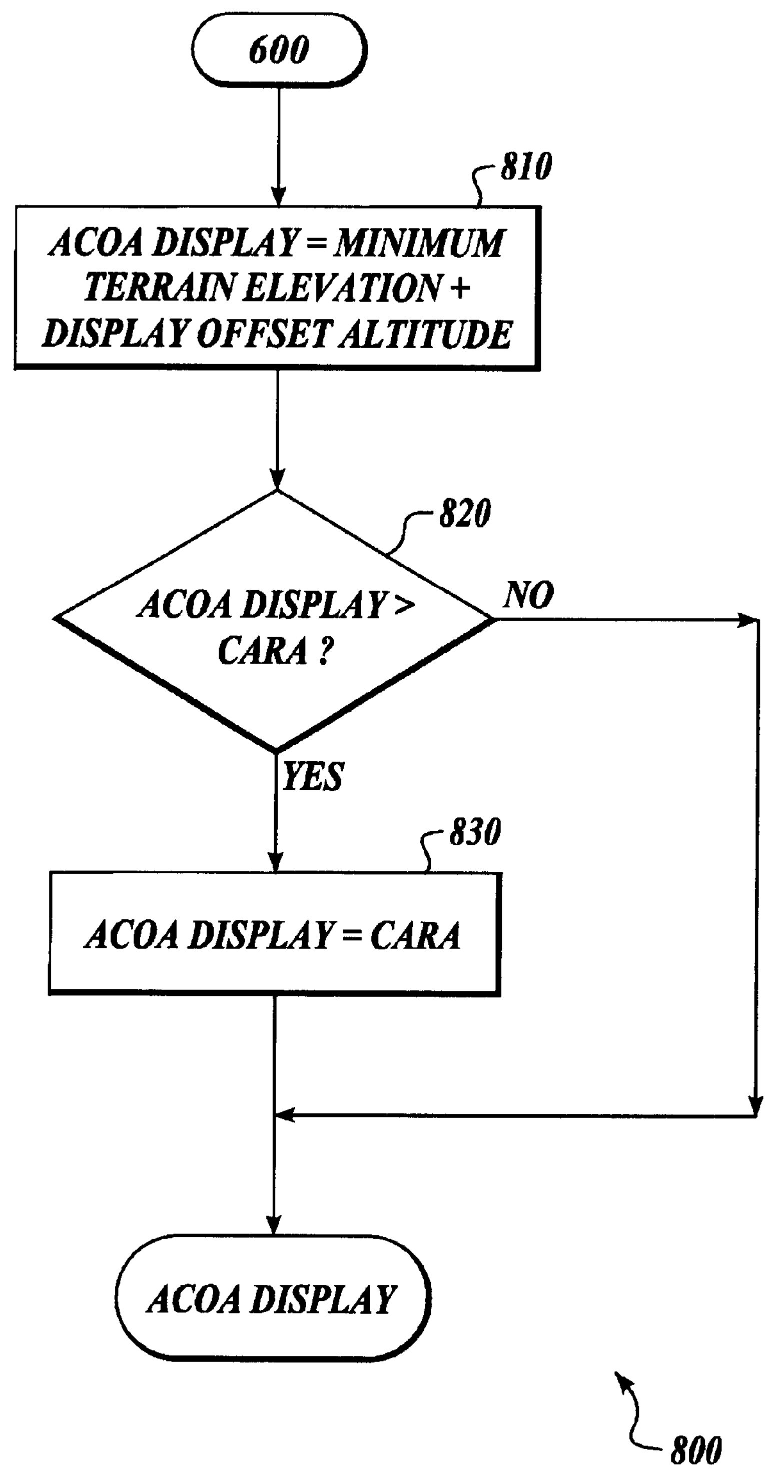

At 600, detailed in FIG. 8, the processor 48 determines the absolute cutoff altitude for detect. As illustrated by FIG. 8, the algorithm first determines at 620 if the aircraft distance to the runway is closer than a runway offset value. If within the offset value, the algorithm sets the absolute cutoff altitude for detect to the NRCA at 635 and sends the value for comparison with GSCA at step 710. Otherwise, the algorithm compares NRCA to CARA at 625, and sends the lesser of the NRCA and the CARA to step 710. At step 710, the algorithm selects the larger of GSCA and the previous comparison steps 620 and 625, and outputs the result as the absolute cutoff altitude for threat detection.

Absolute Cutoff Altitude for Terrain Display

The foregoing steps 100 through 730 determine the absolute cutoff altitude for detection. Step 800 describes the determination of the absolute cutoff altitude for display of terrain, a preferred embodiment of which is described in FIG. 9. At step 810, an intermediate cutoff altitude for display is set at the minimum terrain elevation for the area shown in the EGPWS display unit (not shown) plus a configurable display offset. The area shown in the EGPWS display unit may be selected by the user or be automatically selected. An exemplary display offset is 100 feet of altitude. The intermediate cutoff altitude for display is compared at 820 to CARA, and the lesser of the two values is selected as the absolute cutoff altitude for display. In the exemplary embodiment, the display of terrain at and below the lower of either CARA or 100 feet above the minimum terrain elevation in the displayed area is suppressed. The terrain display suppression in the present invention thus differs from the prior art, in that the prior art uses the lower of either CARA or NRCA as the absolute cutoff altitude for display. Thus, the display suppression of the present invention depends less on the proximity to the nearest runway and more on the characteristics of proximate terrain as displayed on the EGPWS. Furthermore, it is easily seen that, because the absolute cutoff altitudes for detect and display are calculated differently, fewer features near a runway or in mountainous terrain are suppressed than in the prior art display.

After processor 48 calculates the absolute cutoff altitudes for detection and display, it sends these parameters to the threat assessment function within the EGPWS 900. The process begins again at a new instantaneous aircraft position.

The invention has now been described with reference to the preferred embodiments. Several configurable variables have been used and the inventive algorithm does not rely upon the particular value configured. Alternative embodiments of the invention may employ airspeed information instead of ground speed, radio or barometric altimeter information instead of geometric altitude, and the like. In addition, the GSCA may be defined in a number of alternate decreasing functions, such as a continuous function or as a step function with more or less than the preferred three steps, using alternate rotary wing aircraft threshold speeds. Variations and modifications will be readily apparent to those of skill in the art. For this reason, the invention is to be interpreted in view of the claims.

What is claimed is:

1. A display for a terrain awareness and warning system for an aircraft comprising:

an input for receiving a signal indicative of a speed and a position of the aircraft;

a database comprising stored terrain elevation values, a nearest runway cutoff altitude, and a cutoff altitude relative to the aircraft corresponding to an area proximate the aircraft;

a signal processing device for:

generating a speed-based cutoff altitude:

comparing the speed-based cutoff altitude with the nearest runway cutoff altitude and the cutoff altitude relative to the aircraft; and generating an absolute cutoff altitude based on said comparison; and a display output comprising terrain values in excess of the absolute cutoff altitude.

2. The display of claim 1, wherein the size of the area proximate the aircraft is selectable.

3. The display of claim 2, wherein the size of the area proximate the aircraft is selected by a user-activated switch.

4. The display of claim 1, wherein the signal processing device further determines the absolute cutoff altitude for display as a function of aircraft speed.

5. The display of claim 1, wherein the signal processing device further selects for display terrain elevation higher than the absolute cutoff altitude for display.

6. The display of claim 1, wherein the signal processing device further selects the absolute cutoff altitude for display as the lower of the determined absolute cutoff altitude for display according to the minimum terrain elevation value and the second absolute cutoff altitude for display as a function of the cutoff altitude relative to the aircraft.

7. The display of claim 1, wherein the speed is ground speed.

8. A method for displaying terrain elevation information comprising the steps of:

receiving a signal indicative of aircraft position and speed;

receiving a signal defining an area proximate the aircraft;

retrieving elevation information and a nearest runway cutoff altitude from a terrain database for locations within the area;

determining a cutoff altitude relative to the aircraft;

generating a speed-based cutoff altitude;

comparing the speed-based cutoff altitude with the nearest runway cutoff altitude and the cutoff altitude relative to the aircraft;

generating an absolute cutoff altitude based on said comparison; and displaying all of the retrieved values higher than the absolute cutoff altitude for display.

9. The method of claim 8 wherein the size of the area proximate the aircraft is selectable.

10. The method of claim 9 wherein the size of the area proximate the aircraft is selected by a user-activated switch.

11. The method of claim 8 further comprising the step of receiving a signal indicative of the position and elevation of a selected runway.

12. The method of claim 8 wherein the determining a cut-off altitude comprises solving an algorithm based upon the speed of the aircraft.

13. The method of claim 12 wherein the speed is a ground speed.

14. A computer program product for displaying terrain elevation information comprising:

first computer instruction means for receiving a signal indicative of aircraft position and speed;

second computer instruction means for receiving a signal indicative of an area proximate the aircraft;

third computer instruction for retrieving elevation information from a terrain database for locations within the area proximate the aircraft;

fourth computer instruction means for determining an absolute cutoff altitude for display according to a comparison of minimum terrain elevation within the area and the aircraft speed; and fifth computer instruction means for displaying all of the retrieved values higher than the absolute cutoff altitude for display.

15. The computer program product of claim 14 wherein the second computer instruction comprises means of receiving a signal indicative of a position and elevation of a selected runway.

16. The computer program product of claim 15 wherein the fourth computer instruction means further comprises determining a cutoff altitude relative to the aircraft based upon the relative position of the aircraft to the selected runway, and determining the absolute cutoff altitude for display based upon a comparison of the cutoff altitude relative to the aircraft, the aircraft speed, and the minimum terrain elevation within the area.

17. The computer program product of claim 16 wherein the speed is a ground speed.

18. An apparatus for generating an absolute cutoff altitude in a terrain proximity awareness device comprising:

an input for receiving a signal indicative of aircraft speed, a nearest runway cut-off altitude and a cutoff altitude relative to the aircraft;

a signal processing device coupled to the input for:

generating a speed-based cutoff altitude;

comparing the speed-based cutoff altitude with the nearest runway cutoff altitude and the cutoff altitude relative to the aircraft; and generating an absolute cutoff altitude based on said comparison; and an output for transmitting the generated absolute cutoff altitude to the terrain proximity awareness device.

19. The apparatus of claim 18 wherein the aircraft speed is aircraft ground speed.

20. The apparatus of claim 18 wherein the comparing step further comprises a first comparing the nearest runway cutoff altitude with the cutoff altitude relative to the aircraft, selecting one of the nearest runway cutoff altitude and cutoff altitude relative to the aircraft, and a second comparing of said selecting step with the speed-based cutoff altitude.

21. The apparatus of claim 20 wherein the selecting step selects the lower of the nearest runway cutoff altitude and the cutoff altitude relative to the aircraft.

22. The apparatus of claim 21 wherein the second comparing of said selecting step further selects the higher of the speed-based out off altitude and the selecting step.

23. The apparatus of claim 18 wherein the speed-based cutoff altitude is described by a stepped function.

24. The apparatus of claim 23 wherein the stepped function comprises a series of values which decrease at configurable discrete points with an increase of speed.

25. The apparatus of claim 24, wherein the configurable discrete points are a hover speed and a VIFR minimum speed.

26. A method for generating an absolute cut-off value in a terrain proximity awareness device comprising:

receiving a signal indicative of aircraft speed, and a nearest runway cut-off altitude and a cut-off altitude relative to the aircraft;

generating a speed-based cut-off altitude;

comparing the speed-based cut-off altitude to the nearest runway cut-off altitude and to the cut-off altitude relative to the aircraft; and generating an absolute cut-off altitude based upon said comparison.

27. The method of claim 26 wherein the aircraft speed is the aircraft ground speed.

28. The method of claim 26 wherein the comparing step further comprises the steps of first comparing the nearest runway cutoff altitude with the cutoff altitude relative to the aircraft, selecting one of the nearest runway cutoff altitude and cutoff altitude relative to the aircraft, and a second comparing of said selecting step with the speed-based cutoff altitude.

29. The method of claim 28 wherein the selecting step selects the lower of the nearest runway cutoff altitude and the cutoff altitude relative to the aircraft.

30. The method of claim 29 wherein the second comparing of said selecting step further selects the higher of the speed-based cutoff altitude and the selecting step.

31. The method of claim 26 wherein the speed-based cutoff altitude is described by a stepped function.

32. The method of claim 31 wherein the stepped function comprises a series of values which decrease at configurable discrete points with an increase of speed.

33. The apparatus of claim 32, wherein the configurable discrete points are a hover speed and a VWR minimum speed.

* * * * *